(12) United States Patent
Groening (10) Patent No.: US 7,095,141 B2
(45) Date of Patent: Aug. 22, 2006

(54) TRAVELLING FIELD SYNCHRONOUS AC MOTOR

(75) Inventor: Ingolf Groening, Lohr am Main (DE)

(73) Assignee: Rexroth Indramat GmbH, Lohr am Main (DE)

( * ) Notice: Subject to any disclaimer, the term of this patent is extended or adjusted under 35 U.S.C. 154(b) by 0 days.

(21) Appl. No.: 10/491,808

(22) PCT Filed: Nov. 27, 2002

(86) PCT No.: PCT/EP02/13375

§ 371 (c)(1),
(2), (4) Date: Apr. 5, 2004

(87) PCT Pub. No.: WO03/047074

PCT Pub. Date: Jun. 5, 2003

(65) Prior Publication Data

US 2004/0251764 A1 Dec. 16, 2004

(30) Foreign Application Priority Data

Nov. 27, 2001 (EP) ................... 01128196

(51) Int. Cl.
*H02K 41/00* (2006.01)
(52) U.S. Cl. ....................................... 310/12
(58) Field of Classification Search ............... 310/198, 310/202, 203, 208, 12, 13
See application file for complete search history.

(56) References Cited

U.S. PATENT DOCUMENTS

| | | | |
|---|---|---|---|
| 4,752,707 A | 6/1988 | Morrill | 310/189 |
| 5,189,357 A | 2/1993 | Woodson et al. | 318/737 |
| 5,642,013 A | 6/1997 | Wavre | 310/254 |
| 5,729,072 A | 3/1998 | Hirano et al. | 310/258 |
| 5,880,549 A * | 3/1999 | Chiba et al. | 310/168 |
| 5,918,360 A * | 7/1999 | Forbes et al. | 29/596 |
| 6,476,524 B1 * | 11/2002 | Miyamoto et al. | 310/12 |
| 6,611,073 B1 * | 8/2003 | Kanebako et al. | 310/90.5 |
| 6,710,495 B1 * | 3/2004 | Lipo et al. | 310/184 |
| 6,713,903 B1 * | 3/2004 | Widdowson et al. | 310/12 |

FOREIGN PATENT DOCUMENTS

| | | |
|---|---|---|
| DE | 199 05 748 A | 8/1999 |
| EP | 0 740 405 A | 10/1996 |

* cited by examiner

*Primary Examiner*—Darren Schuberg
*Assistant Examiner*—Nguyen N. Hanh
(74) *Attorney, Agent, or Firm*—Michael J. Striker (57) ABSTRACT

The invention relates to a synchronous AC electric motor with concentrated windings (2), whereby one primary side pole is comprised of a series of toothed-modules (4) with each toothed-module (4) being connected in the correct electrical phase sequence to a corresponding phase (11) of the motor electrical supply (5). In order to provide a highly optimized concentrated winding motor design applicable equally to either linear or rotating machines, which retains the performance benefits of existing concentrated-winding motors it is proposed that neighboring modules (4) are wound so as to have alternating polarities, whereby the number of toothed-modules (4) comprising a primary side pole is exactly equal to twice the number of motor phases (5), and that the motor is designed to operate using an air-gap flux component which is harmonic of the fundamental phase current frequency.

13 Claims, 6 Drawing Sheets

TRAVELLING FIELD SYNCHRONOUS AC MOTOR

BACKGROUND OF THE INVENTION

The invention relates to a method for reducing torque ripple in AC brush-less motors with concentrated windings. AC synchronous travelling or rotating field motors with concentrated primary side windings i.e. windings in which individual coils, wound onto single primary side toothed-modules are connected together to form one phase of the motor winding, have significant performance benefits when compared to standard rotating AC field motors with overlapping or so called distributed or sine-weighted windings.

These benefits have been well understood for several years and include reduced power loss, increased torque density, simplified and more highly automated manufacturing processes and lower tooling costs. All of these advantages spring from the fact that the concentrated winding occupies less physical space than a distributed winding.

A distributed winding must traverse the motor primary side, and must be wound such that the coils of one winding overlap with those of a second winding. The difficulties in physically fitting such windings into the available space on the primary side result in reduced slot fill factor i.e. less wire in each of the primary side slots, and large lengths of wire running between the primary side slots at the ends of the motor. These so called end-windings do not contribute to torque production, but do increase the winding resistance and thus the heat losses which are proportional to the resistance, and thus reduce motor efficiency.

Concentrated winding motors on the other hand, are usually formed by winding coils onto individually produced primary side toothed-modules, which are themselves built up from multiple laminations. The wound modules are subsequently welded or otherwise joined together to form the primary side of the motor.

SUMMARY OF THE INVENTION

This kind of motor is described in U.S. Pat. No. 5,729,072 which shows how the physical construction of the winding enables the slot-fill factor to approach the theoretical maximum, while reducing the length of the end winding to an absolute minimum. This combination of desirable characteristics tends to produce a motor which, for a given torque, has a very low volume and is highly suitable for applications were space is at a minimum, such as robotic or materials handling applications.

The concentrated-wound type of motor has however a number of undesirable characteristics, both electromagnetic and physical, which can limit its use in servo applications. The concentrated nature of the primary side windings results in a magnetic system which tends to produce high levels of harmonics in the air-gap flux which, when coupled with corresponding harmonics in the magnetising flux circuit, create unwanted variations in the motor output torque or force. This torque ripple must be compensated for in the servo control system if the resulting motor speed is not to display an unacceptable level of ripple.

In order to avoid this, special measures must be taken in the design of concentrated winding motors in order to reduce the levels of torque/force ripple present in the output of the motor, which would otherwise reduce the absolute performance of the drive system. These measures include skewing the magnets on the secondary side or skew-magnetising the secondary side itself or zoning the winding which involves distributing the winding across several slots within one toothed-module. Even after such measures are taken, the motor's output torque can still contain a significant element of ripple.

Furthermore, the requirement that the toothed-segments be wound individually and subsequently joined together, place large demands on the accuracy of the manufacturing process as great care must be taken in joining the segments together in order to preserve the magnetic properties of the motor primary side itself.

Additionally, care must be taken in the magnetic circuit design to reduce the reluctance and cogging torque components which are due to the variation in secondary side position and the primary side inductance, which ultimately also appear as non-linearities in the motor's output torque or force.

These optimisation processes which are required to overcome the inherent disadvantages of the design, all tend to increase the manufacturing cost of the motor and reduce its ultimate efficiency.

It is the object of the present invention to provide a highly optimised concentrated winding motor design applicable equally to either linear or rotating machines, which retains the previously discussed performance benefits of existing concentrated-winding motors, such as high torque and reduced losses while further improving the manufacturability of the motor, reducing its production costs, increasing its torque producing efficiency and simultaneously improving its performance by reducing non-linearities in the output torque which reduces the demands on the motor servo control system.

The current invention achieves these aims in that a concentrated-winding rotating-field AC synchronous motor with a number P current carrying motor phases, $P_1$ to $P_N$, is constructed such that each electromagnetic pole of the primary side is comprised of a sequence of N toothed-modules each wound with a coil, whereby the coil of each successive module is connected to the next electrical phase, following in the correct electrical sequence. The toothed-modules are subsequently wound so as to have alternating polarities, and the number of modules N is equal to twice the number of motor phases i.e. $N=2 \times P$.

The winding pattern and primary side geometry which is the object of the current invention, results in a travelling electromagnetic field in the motor air-gap which, when decomposed into its components by means of a mathematical method such as the Fourier Transform, can be demonstrated to be composed of a number of space harmonics with predictable frequencies and magnitudes, one of which is chosen as the base frequency for driving the motor.

The torque producing space harmonics are multiples of the fundamental phase current frequency which is itself also present in the air-gap magnetic field, however, the motor secondary side is designed so as to produce a magnetising field which has no component at the fundamental phase current frequency. This is achieved by controlling the spatial distribution of the magnets on the secondary side magnet carrier. The physical positions of the magnets with respect to each other and to the motor primary side is a critical factor in determining the characteristics of the motor. As motor torque is due to the interaction of an electromagnetic field component with a corresponding magnetising field component, there is no output torque at the fundamental frequency.

A similar argument can be applied to other higher frequency components of the air-gap electromagnetic field, whereby due to the choice of primary side geometry and winding pattern, the components either do not exist or have been deliberately reduced in magnitude, so as to eliminate or reduce the corresponding torque components.

The resulting motor has an output torque which contains significantly reduced levels of ripple torque, i.e. variations of torque with position or current, in comparison to other standard concentrated winding motors.

This results in a synchronous motor which can be more easily and accurately regulated when used as an actuator in a servo control system, for example using a standard PID velocity control system, a given maximum allowable velocity ripple could be achieved with a reduced controller gain factor, thus improving the gain margin and the system stability.

A main benefit of the invention is the significant reduction in the variation in motor output torque with rotor or secondary side position, achieved by among other things, the use of a motor operating frequency which is a harmonic of the fundamental phase current frequency. In order to achieve this, an air-gap flux is generated with harmonic components which are significant in amplitude in comparison to the fundamental frequency component. The invention thus describes a motor primary side winding pattern whereby the coils on the toothed-modules are wound so as to form a sequence of alternating polarities. I.e. the coils are wound alternatingly in a clockwise and anticlockwise sense.

In other words, the coil or winding on each toothed-module in the sequence is wound and connected to one of the phases of the motor AC electrical supply such that, if it were possible to view the primary side from the secondary or air-gap side at a point in time when all motor phase currents were positive and flowing into the motor (which is in reality an impossible situation but helpful for understanding), and all coils were energised, the polarity of the magnetic field in the air gap created by the toothed modules would alternate . . . -North-South-North-South- . . . . This is denoted, for motor phases P1 to Pn by the following electrical winding pattern:

P1 –P1, –P2 P2, P3 –P3 . . . Pn –Pn, –P1 P1, P2 –P2, –P3 P3, . . . –Pn Pn.

Any electromagnetically equivalent winding pattern i.e. any winding pattern which by virtue of a symmetrical invariance with the pattern of this invention, produces an equivalent electromagnetic field, may also be used to produce the same result.

In the present invention, the number of and thus physical size of the secondary side magnets, for a given secondary side diameter and a given primary side geometry, is related to the frequency of the torque producing component of the electromagnetic field. The use of a frequency component which is a multiple of the fundamental phase current frequency, dictates that the magnet size be proportionately reduced in comparison with a similar standard AC field motor which makes use of the fundamental frequency, as the wavelength of the higher frequency component is proportionately shorter than that of the fundamental component. The individual magnets on the secondary side are thus small in comparison to the length of a primary side magnetic pole. This allows the air gap flux to be optimised by adjusting the spacing between individual magnets on the secondary side, such that the variations in air-gap inductance around the motor are minimised. Thus, without the addition of structures such as pole shoes, as shown in U.S. Pat. No. 5,729, 072, the reluctance and cogging torque generated by the variations in inductance with angle in the magnetic circuit of the motor can be minimised.

The invention describes a synchronous motor with primary side slots with practically parallel sides with no pole-shoe, which thus benefit from having wide apertures facing the air-gap. This mechanical structure allows individual windings to be easily inserted in situ onto the toothed-modules on the motor primary side, thus allowing the construction of a high slot-fill factor motor, while at the same time removing the requirement for a time consuming winding process.

It is an advantage of the present invention that the primary side of a concentrated winding motor is produced from a stack of laminations of a suitable geometry, each of which is formed as a single piece, by processes such as stamping or laser cutting which are commonly used in the production of standard AC motors. Each lamination contains all the toothed modules required to construct a complete primary side, so for example each of the single laminations for a cylindrical rotational motor are circular in form. This results in an inherently rigid and stable motor structure which does not require further processing steps such as welding or gluing common to the production of concentrated winding motors as, for example, described in U.S. Pat. No. 5,729, 072.

Due to the elimination of the pole-shoe, it is physically possible to insert, in situ, a pre-wound coil with a geometry corresponding to the physical geometry of a motor primary side tooth, directly onto the primary side tooth in a completed primary side. Thus in a further novel feature, the invention allows the flexibility of manufacturing a high slot-fill factor, concentrated winding motor primary side, from a stack of single laminations using processes common to the production of standard rotational or linear AC motor primary sides.

A further embodiment of the invention encompasses a linear AC synchronous motor with multiple primary side poles, whereby in order to allow some flexibility in the sizing of the toothed-modules for a given motor primary side length, the winding pattern can be non-symmetrical or incomplete at one end of the motor. Thus, for example, in a linear AC synchronous motor with four primary side poles and phases P1 to Pn the following winding pattern would be repeated 3 times, once for each pole:

P1 –P1, –P2 P2, P3 –P3 . . . Pn –Pn, –P1 P1, P2 –P2, –P3 P3, . . . –Pn Pn, and the final section would have the incomplete pattern:

P1 –P1, –P2 P2, P3 –P3, . . . Pn –Pn

In a further embodiment the ratio of secondary side pole length τp (6) to stator slot spacing τm (7) is such that $$\frac{\tau p}{\tau m} = \frac{m'}{m'+1} q',$$

whereby for a symmetrical winding the number of virtual motor phases m' is equal to the number of real motor phases (5) m, and for an asymmetrical winding is equal to 2×m, and whereby the factor q' is equal to half the length of one toothed-module (4), ie, $$q' = \frac{z}{2},$$

when the module is wound with a free slot (13), and otherwise $$q' = q = \frac{N}{2 \cdot p \cdot m},$$

a whole number, where p represents the number of motor primary side poles (3), and N represents the number of primary side slots (13).

In a further preferred embodiment of the invention, the primary side of a concentrated winding motor is designed to maximise the output torque, in that the ratio of secondary side pole length to primary side slot-width to is 6:5. This produces an electromagnetic air-gap flux which allows the secondary side to be optimised so as to eliminate the $7^{th}$ harmonic component in the output torque and minimise the $11^{th}$ and $13^{th}$ harmonic components. This results in a motor which is optimised for maximum output torque while maintaining acceptable torque ripple and retaining a magnet size which is easy to handle in the manufacturing process.

In a further preferred embodiment of the invention, the primary side of a concentrated winding motor is optimised such that the ratio of secondary side pole length to primary side slot-width is 6:7. This produces an electromagnetic air-gap flux which allows the $7^{th}$ harmonic to be used as the base frequency. The advantage of this geometry is a significantly reduced torque ripple due to the $5^{th}$ harmonic component of the electromagnetic flux having no counterpart in the magnetising field, which is itself designed to operate with the $7^{th}$ harmonic.

The required magnet size decreases with the increase in motor base frequency, thus for a given motor size it becomes difficult to handle the magnets once secondary side pole length to primary side slot-width ratios increase beyond a given level. Ratios of 6:5 and 6:7 have been found to be best suited to the production of small and medium sized servo motors, however for larger motors, ratios of 6:11, 6:13 or higher become practical and allow further optimisation of the magnetic circuit geometry.

In another preferred embodiment of the invention the number of motor phases is equal to 3, resulting in a concentrated winding synchronous AC motor which is compatible with all standard AC motors, and thus all standard converters, inverters and mains supply topologies. This allows the motor to be operated using readily available 3 phase power control systems.

The primary side winding is thus connected such that in a standard 3-phase motor with motor phases a, b, and c, adjacent coils are wound such that one complete magnetic pole of the primary side, which comprises of a sequence of six toothed-modules, has a winding pattern: a –a, –b b, c –c, a a, b –b, –c c where a minus sign indicates the side of the coil at which a positive motor current, i.e. a current flowing into the motor phase from the supply, would flow out of the respective coil. The resulting space vector magnetic field obtained from such a winding pattern may also be achieved using winding patterns which are geometrically equivalent, arrived at by employing techniques such as, for example, zoning.

The magnetising field of a synchronous AC motor is, in general, produced by multiple permanent magnets arranged on the secondary side, although in larger machines it may be beneficial to produce the secondary side field electromagnetically, the magnets being located physically on the secondary side radially or diametrically opposed to the primary side. There are a number of mechanical variations possible on the secondary side such as the use of surface magnets or buried magnets, the current embodiment of the invention uses surface-mounted magnets which have a fixed correspondence to the primary side's toothed-modules.

Figure 1:
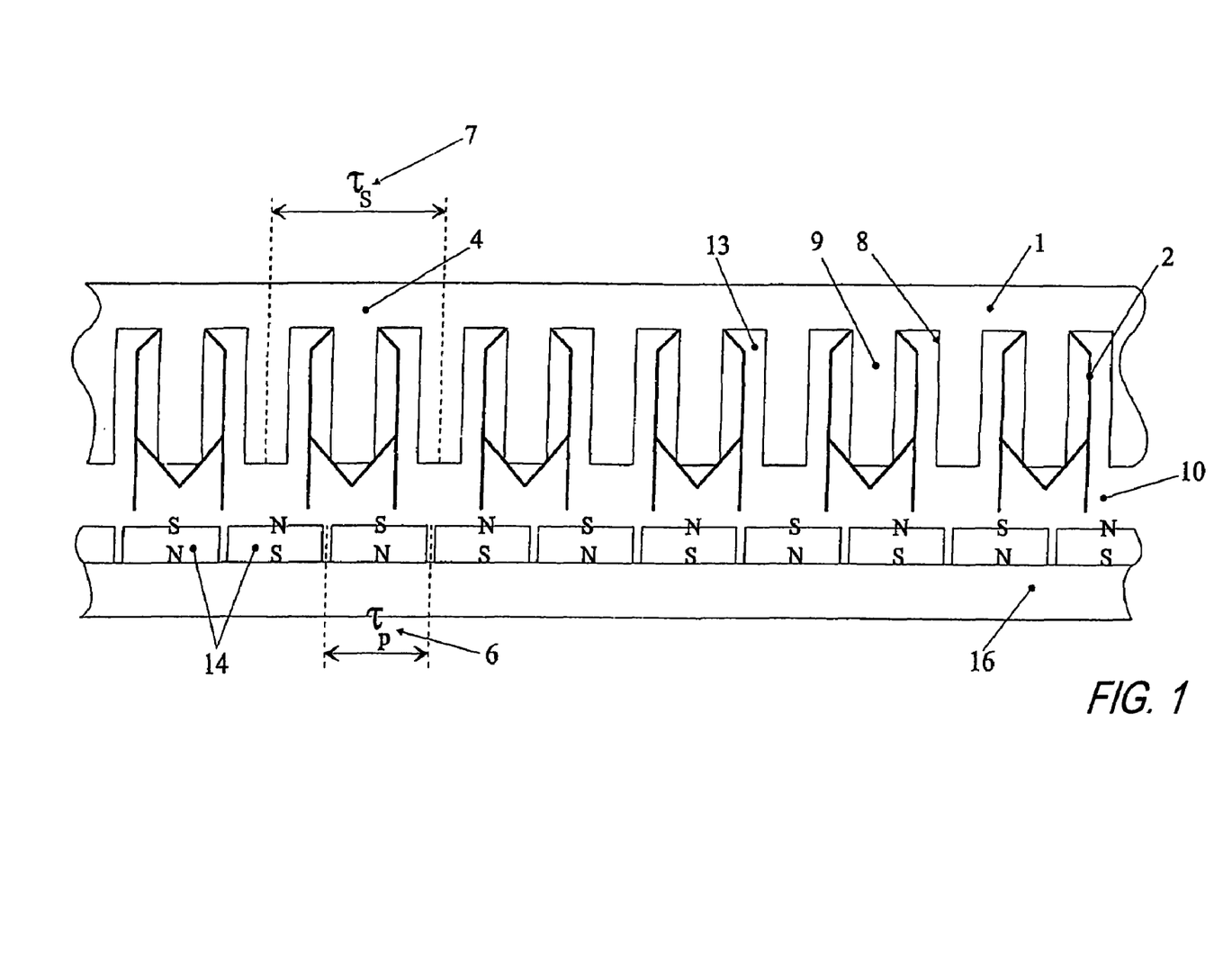
FIG. 1 Shows a longitudinal schematic cross-section of the primary side and corresponding permanent magnet secondary side of a 3-phase motor which describes a first embodiment of this invention.
Figure 2:
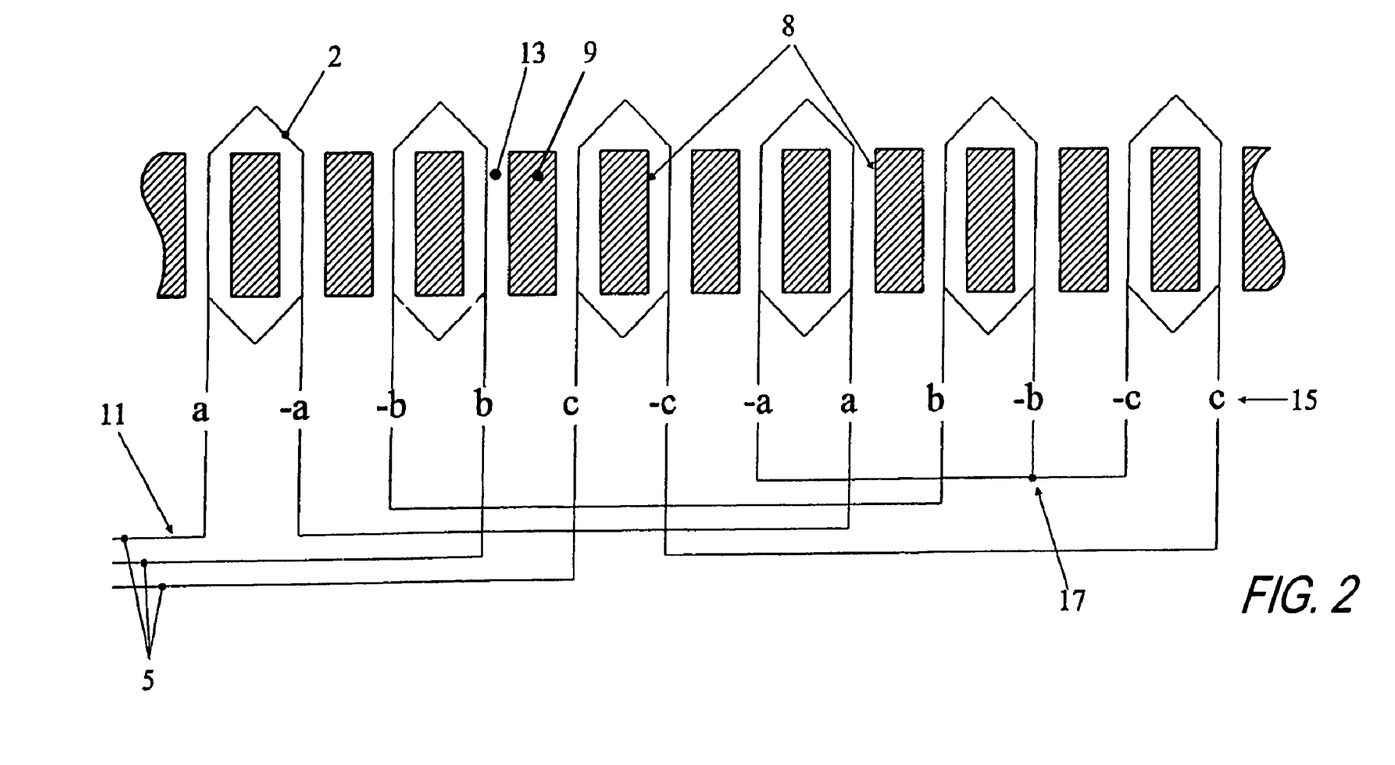
FIG. 2 Shows a sectioned plan-view of the primary side of a 3-phase linear synchronous AC motor corresponding to the claims of the current invention.

The current invention can be more clearly understood by reference to the following diagrams whereby FIGS. 1 and 2 together define a preferred embodiment.

DESCRIPTION OF THE PREFERED EMBODIMENTS

FIG. 1 shows a front view schematic of a multiphase synchronous AC motor in cross section, whereby the stator or primary side (1) is constructed of a sequence of toothed-modules (4) which are themselves composed of one or more teeth (9). The schematic of FIG. 1 can be thought of as showing a cross-section of the primary side (1) of a cylindrical machine, which has first been 'sliced open' down its length and rolled out flat. This structure can be used to represent the functioning of a linear or a cylindrical machine.

The motor primary (1) and secondary (16) sides are made up of a number of thin ferromagnetic steel sheets known as laminations which have a cross-section as shown in FIG. 1, these laminations are stacked together to form the motor primary (1) and secondary (16) sides. The motor may have a further mechanical structure or housing used to hold the stacked laminations.

Each of the primary side (1) laminations displays a repeating 'T' shaped pattern along its length, the basic unit of which is called a toothed-module or simply module (4). The modules are themselves comprised of one or more substantially 'T' shaped teeth (9), with the horizontal section of the 'T' being common to each of the one or more teeth (9) in the module (4), and the vertical section representing one single tooth (9). This results in the modules having either a simple 'T' shape, or a comb-like structure.

The gaps between the teeth (9) are known as slots (13), and each slot (13) contains one half of one concentrated winding (2). Each winding is made up of one or more 'turns' of wire which are wrapped around, or pre-formed and inserted around, a ferromagnetic tooth (9), to form what is, in effect, an electromagnet.

Each coil (2) is designed to carry a current (11) which creates a magnetic field whose shape and strength is determined by the geometry of the ferromagnetic structures in the motor.

There are two sources of magnetic energy in the motor, permanent magnets (14) and current carrying coils (2). The field created by the permanent magnets (14) is referred to as the magnetising field, and that produced by the phase currents (5) flowing through the coils (2), as the electromagnetic field. The orientation of the magnetic fields i.e. N-S or S-N is referred to as the polarity of the field.

Figure 3:
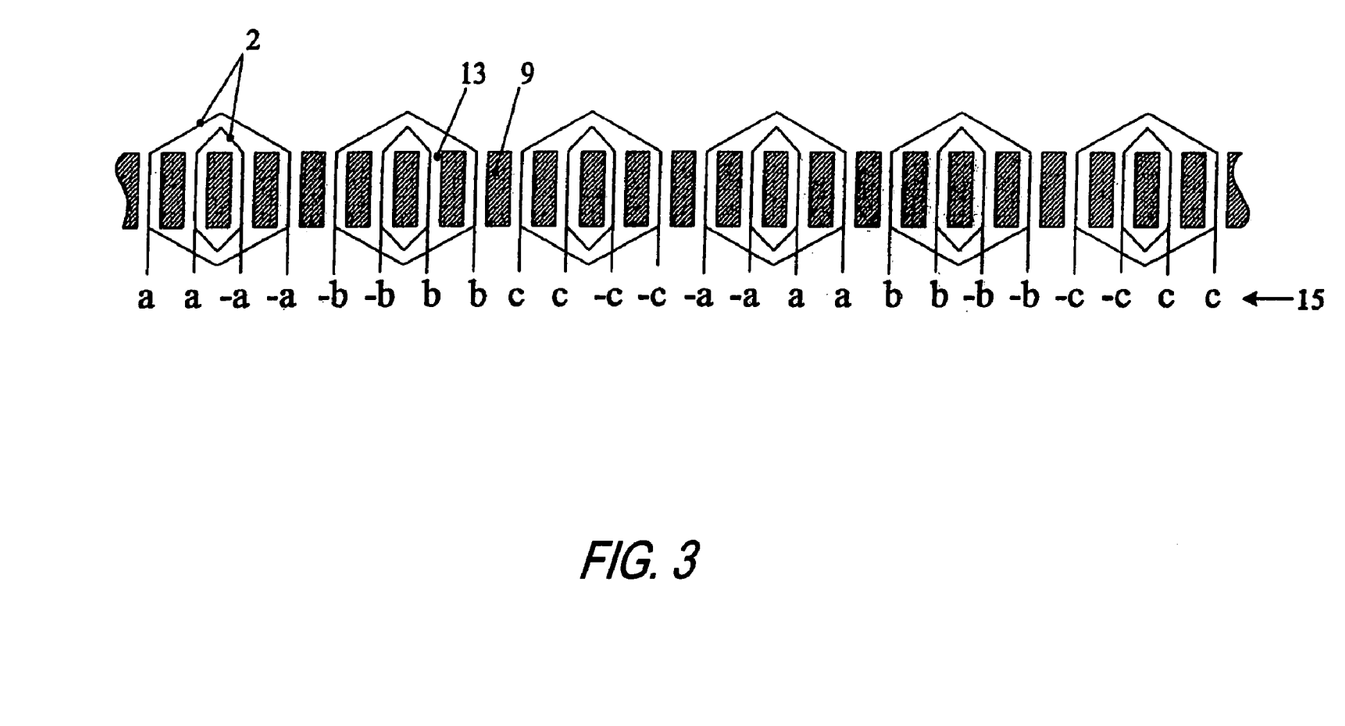
FIG. 3 Shows an example of 'zoning'
Figure 4:
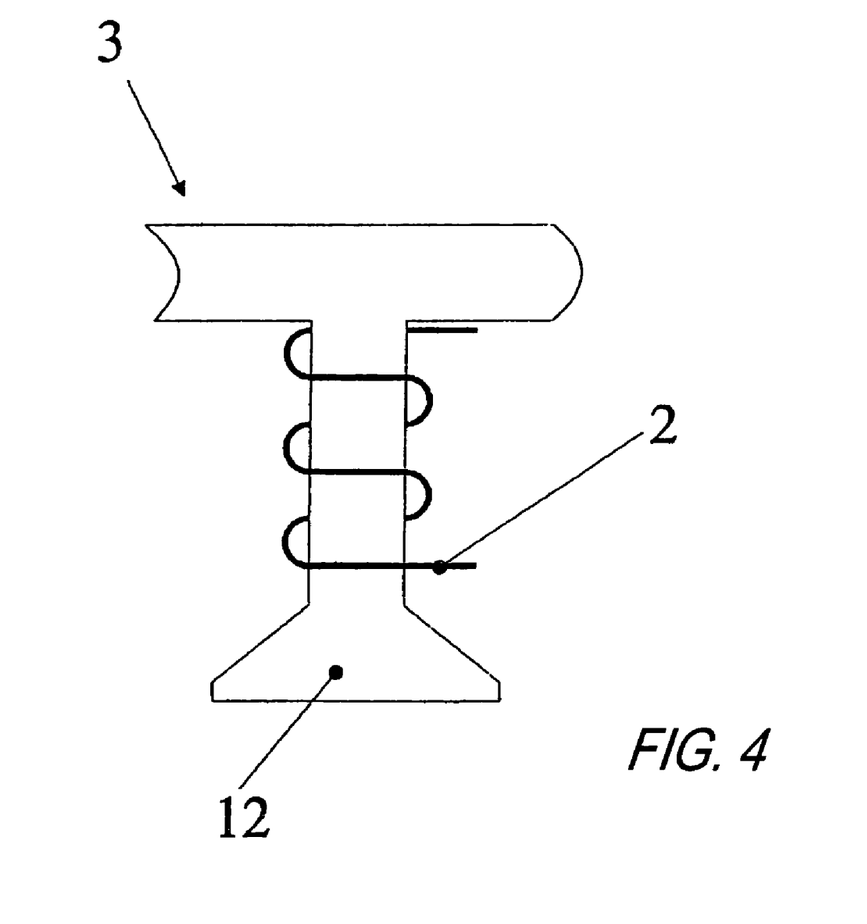
FIG. 4 Shows a primary side tooth with pole-shoe

The coil (2) on each toothed-module (4) is wound such that the polarity of the resulting electromagnetic field is the same regardless of whether the module (4) has a simple 'T' shape, and thus a simple concentrated winding (FIG. 1), or a comb-like structure and thus a zoned winding (FIG. 3), where within one module the winding is distributed over a number of teeth. That is to say, a positive current flowing into either of these windings (2) would, in both cases, produce a magnetic flux in the associated ferromagnetic tooth material with the same polarity or spatial orientation. Moreover, the coils (2) on the toothed-modules (4) are wound such that when a positive current is flowing into all coils i.e. a flow of current into the motor, consecutive or neighbouring modules (4) always have opposite polarities. The magnetic flux, which is directly proportional to the magnitude and phase of the current flowing in the windings (2), flows in a magnetic circuit comprising principally of the primary side (1), the secondary side (16) and the air-gap between them (10). This flow of flux from primary side (1) to secondary side (16) and back, creates the torque-producing magnetic field or flux in the air-gap (10). The coil (2) of each individual module (4) is connected to a single phase (11) of the motor supply, whereby consecutive modules (4) are connected to consecutive phases of the motor supply. All phases (5) carry essentially sinusoidal currents of equal magnitudes but with varying electrical angles, i.e., each phase current in the sequence is offset from the previous phase current (5) by a fixed angle equal to $$\frac{2\pi}{P}$$

radians, where P is the number of motor phases.

The magnetic fields produced by neighbouring windings (2) interact to produce a resultant air-gap flux which is dependant upon the geometry of the ferromagnetic components, the geometry of the windings (2), and the magnitude and phase of the winding currents (5).

This resultant air-gap flux is a vector quantity which varies both in time and space, whose frequency components can be analysed by transformation from the time domain into the frequency domain. This can be achieved by using a suitable mathematical transformation such as the Foiurier transform. The time varying flux waveform can thus be shown to be made up of a sum of individual waveforms at frequencies which are integer multiples of the supply current (11) or fundamental frequency, each of which has a magnitude which is directly linked to the geometry and winding pattern (15) of the primary side (1), and each of which propagates or travels around or along the air gap (10).

The motor can be optimised to use any of the frequency components of the air-gap flux as the torque producing component, this frequency then being referred to as the motor base frequency.

The performance of the motor is also closely tied to the relationship between the geometry of the secondary side (16), and the geometry of the primary side (1), a key measure of which is the ratio between the length of, or circumferencial angle subsumed by one primary side toothmodule (7), and the corresponding length of, or circumferencial angle subsumed by, one secondary side pole (6). A secondary side pole length or circumferencial angle (6) being defined as the total length of the motor secondary side active element, or $2 \cdot \pi$ radians, divided by the number of magnetic poles on the secondary side (16). One secondary side (16) magnetic pole (6) comprises, in effect, one magnet and one half of the gap between it and its neighbouring magnets on either side. A primary side pole is defined as the number of modules required to form a complete pattern (15), e.g. a 3-phase machine with winding pattern (15):

a −a, −b b, c −c, −a a, b −b, −c c, would require 6 modules. A 'P' phase machine would thus have 2×P modules (4) per primary side pole.

The secondary side (16) is constructed as shown in FIG. 1 with multiple permanent magnets (14) being fixed onto a laminated ferromagnetic carrier whereby a small gap of defined dimensions (20) is left between the magnets (14), and subsequent magnets have alternating polarities. The magnets (14) are orientated such that they are, as far as possible, parallel to the toothed-modules (4) on the primary side (1).

The distance between the secondary side (16) and primary side (1) is mechanically fixed to produce an air-gap (10) of, ideally, constant dimensions, the absolute size of which is dependant upon the type and performance of the motor being built.

On the primary side (1) of a 'P' phase machine, the alternating polarity of the concentrated windings (2) produces the geometric pattern P1 −P1, −P2 P2, P3 −P3 . . . Pn −Pn, −P1 P1, P2 −P2, −P3 P3, . . . −Pn Pn, which in a 3 phase machine with phases a, b, and c, such as that shown in FIG. 2, results in the winding pattern (15):

a −a, −b b, c −c, −a a, b −b, −c c, where the individual motor phases (11) are connected to the windings (2) as shown, and the windings (2) are connected to each other at a 'star' point (17).

The phase currents (5) are sinusoidal in form and have a fundamental frequency component cos(ωt−α), i.e. each phase (11) rotates at a velocity ω radians per second, and each phase (11) precedes the next by an electrical angle of 120° or $$\frac{2\pi}{3}$$

radians, thus:

$$U \equiv a = \cos(\omega t), V \equiv b = \cos\left(\omega t - \frac{2\pi}{3}\right), W \equiv c = \cos\left(\omega t - \frac{4\pi}{3}\right)$$

Where U, V and W are common descriptors for the phases (5) of a standard three phase AC motor.

The phase currents (5) flowing in the windings (2) generate a magnetic flux in the motor ferromagnetic primary side (1), the motor geometry being such that the flux path is practically radial or normal and across the air-gap (10) between the primary side (1) and secondary side (16). The sum of the air gap flux components in space and time is itself a sinusoidal quantity which propagates around, or in the case of a linear motor along, the air-gap (10). This travelling wave interacts with the motor magnetising flux produced by the permanent magnets (14) to produce a torque or force output.

The flow of current in the windings (2), which are ordered so as to have a winding pattern (15), results in an air-gap flux which is a complex time domain waveform, which can be represented in the frequency domain by a series of sinusoidal components at the fundamental frequency and integer multiples thereof.

The magnitude of the fundamental, or lowest frequency, component of the air gap flux produced by the winding pattern (15), can be shown to be significantly attenuated in comparison to that of the 5th and 7th harmonics. This feature of the invention allows a harmonic of the fundamental frequency to be used effectively as the base frequency for driving the motor, and not the fundamental frequency itself as is common practice.

Furthermore, as the air gap magnetising flux produced by the permanent magnets (14) is designed so as to have no component at the fundamental frequency 'ω' of the rotating or travelling electromagnetic field, there is no corresponding torque or force component in the motor output. The torque producing components of the air-gap flux space harmonics generated by the primary side phase currents (5), are those components which interact with equivalent components of the magnetising field created by the arrangement of permanent magnets (14). For example, in a motor with a geometry as shown in FIG. 2 whereby the pole (6) to slot (7) ratio is 6:5, the main torque producing components are the $5^{th}$, $7^{th}$ and $13^{th}$ harmonics.

It is possible to 'tune' the torque producing components of the air-gap flux, by modifying the geometry of the toothed-modules (4) using techniques such as zoning, FIG. 3, without in any way modifying the basic winding pattern (15). By such means it is possible to accentuate the desired torque producing components of the air gap flux, while attenuating or eliminating other components which would otherwise contribute only to ripple in the output torque (19).

A further unwanted torque component is produced by the changes in magnetic circuit geometry which occur as the secondary side (16) moves relative to the primary side (1). The flux, which is produced by the permanent magnets (14), is forced to flow in a magnetic circuit with varying levels of reluctance. The attractive and repulsive reluctance forces or torques thus produced tend, because of the unavoidable symmetry of a motor's geometry, to sum together around or along the machine. Suitable placement of the secondary side magnets (14) with respect to each other, and to the primary side teeth (9), can reduce this effect, however, in standard designs it is necessary to include a pole shoe structure (12) i.e. to widen the tooth towards the air—gap (10) end, in order to minimise changes in reluctance with magnet (14) position. The use of a harmonic of the fundamental supply current frequency as the motor base frequency, allows the use of magnets (14) which are small in comparison with a primary side pole. This allows the secondary side (16) to be optimised by the use of suitable magnet spacing (20), and pole (6) to slot (7) ratios, so that even without the use of pole-shoes (12), the sum of reluctance torque around or along the machine always tends to zero.

An immediate benefit of the lack of a pole-shoe (12), is the possibility of inserting a pre-wound coil (2) directly onto a tooth (9) in a completed primary side (1). This removes the need for producing single, wound, toothed-modules (4), which then must be joined together in a further manufacturing process such as welding or gluing.

As stated, optimal designs for such a motor have been mathematically derived and tested, and have been found to have ratios of 6:5, 6:7, 6:11, 6:13 and higher. The higher the ratio, the higher the base frequency, and thus the smaller the relative size of the magnet required, i.e. the magnet size is directly proportional to the motor size. At some point a secondary side pole width (6) becomes so small that the magnets can no longer be easily handled in the manufacturing process. Ratios of 6:11, 6:13 and higher result in magnet (14) sizes which would be applicable to the construction of physically large motors, for example rotational AC synchronous permanent magnet motors with a diameter of greater than 20 cm, where the magnets (14) would still be large enough to handle easily.

Figure 5:
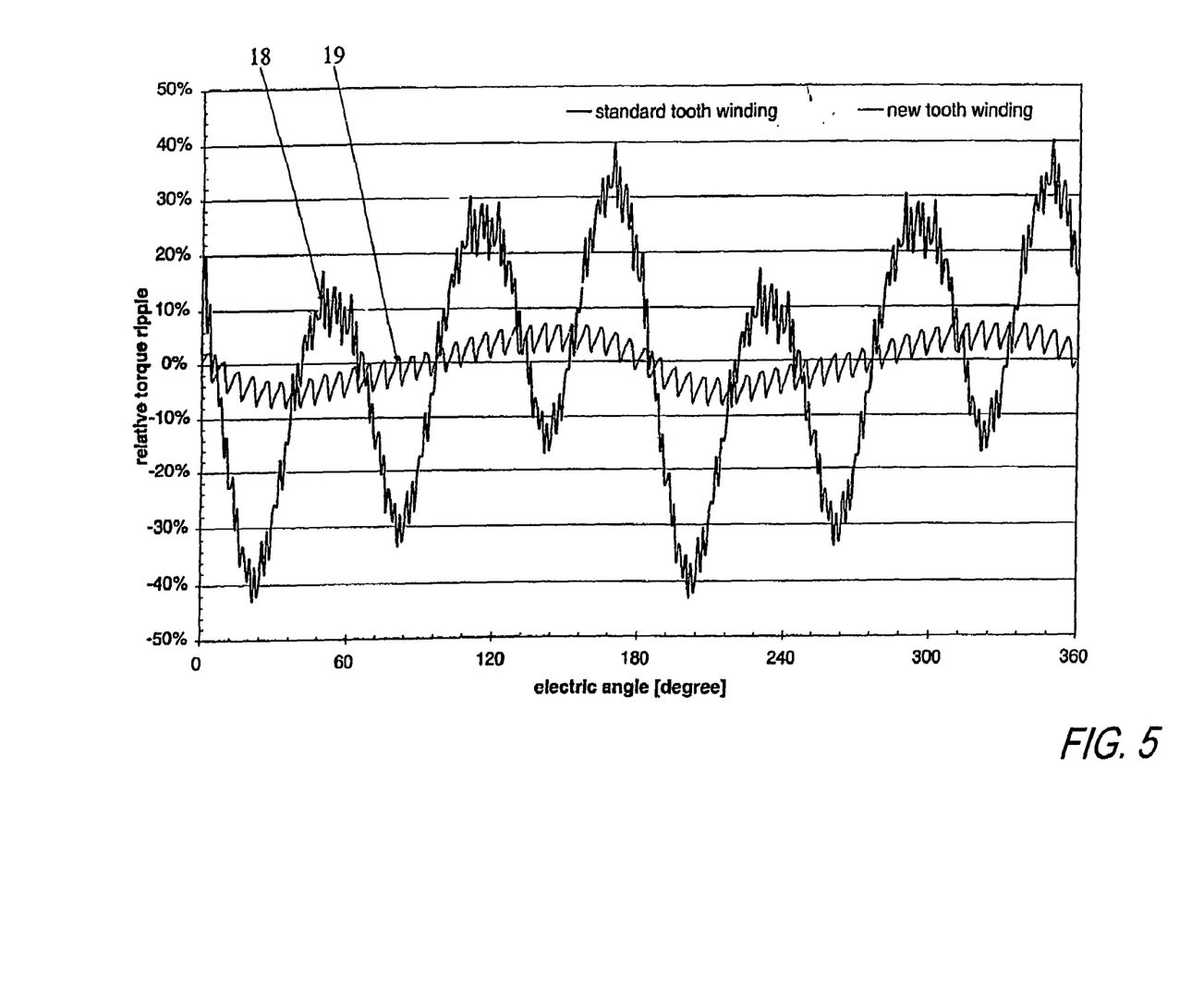
FIG. 5 Shows graphical comparisons of torque versus electrical angle for a standard concentrated winding motor and the current invention.
Figure 6:
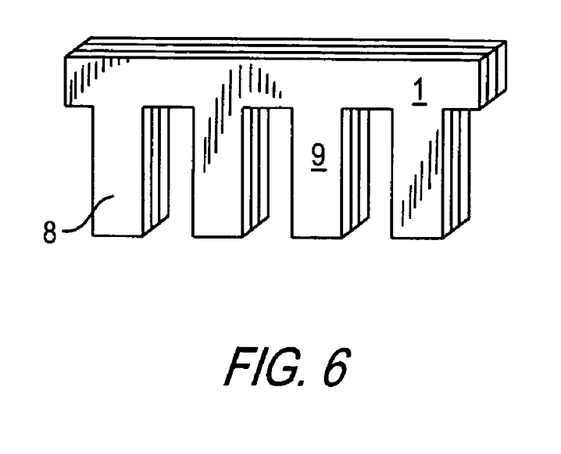
FIG. 6 Shows a section of three-dimensional drawing of a motor primary side without coils constructed from laminations FIG. 7 Shows a pre-wound copper coil insertable into the slots of the motor primary side.
Figure 7:
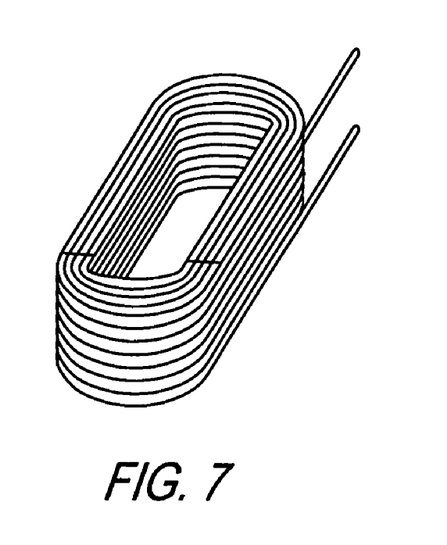

The benefits of the invention can be clearly seen when a comparison is made between the output torque of a motor with a standard concentrated winding construction, and that of a motor with a construction as embodied-in the present invention, the results of which can be seen in FIG. (5). The level of torque/force ripple i.e. deviation about a mean torque level (19), produced by a motor constructed following the teachings of the present invention, measured as a percentage of the motor average torque/force, can be seen to be significantly lower than that of a conventional concentrated winding design (18). The standard motor has a somewhat higher maximum torque, but this is in reality not useable, because ultimately the level of torque ripple dictates the motor and servo system performance.

The significant reduction in torque ripple which is possible in a motor design incorporating the concepts of the current invention, results in an increase in useable motor torque, and thus an increase in the torque producing efficiency of the motor itself as measured in $Nm.A^{-1}$ or $N.A^{-1}$.

It is thus clear that the advantages of the present invention are obtained by creating a synchronous AC motor with concentrated windings (2) on the primary side (1), having a geometry and winding pattern (15) which results in a magnetic space wave whose main component is a harmonic of the supply current frequency, which interacts with a corresponding component of the magnetising field on the secondary side (16) to produce a substantially ripple free torque.

LIST OF FIGURES

1. 'P' phase motor stator
2. Concentrated winding
3. Standard concentrated winding
4. Toothed module
5. Motor supply phases
6. Secondary side pole length
7. Slot spacing
8. Tooth edge
9. Tooth
10. Air gap
11. Phase current
12. Pole shoe
13. Slot
14. Permanent magnets
15. Winding pattern
16. Secondary side
17. Star connection point
18. Motor output torque curve
19. Motor output torque curve
20. Inter-magnet gap

The invention claimed is:

1. A linear traveling field synchronous AC electric motor with a primary side (1) comprising concentrated windings (2); a series of toothed-modules (4) each wound with a coil (2), whereas each toothed-module (4) can comprise a single or a plurality of teeth (9), the coil of each successive toothed-module (4) being connected in the correct electrical phase sequence to a corresponding phase (11) of the motor electric supply (5), whereby each toothed-module (4) shows a contrarily winded winding and a contrarily applied current compared to its neighboring toothed-module (4), and the number of toothed-modules (4) is exactly equal to twice the number of motor phases (5), characterized in that a secondary side (16) arrangement is comprised of a plurality of magnets (14) which produce a magnetizing field that has no component of a fundamental phase current frequency and that interacts with an air-gap-flux produced by at least one harmonic of the fundamental current phase frequency applied to the primary side (1), said harmonic being thereby used as the base frequency for driving the motor.

2. A linear traveling field synchronous AC electric motor according to claim 1, characterized in that the windings of the succession of toothed-modules (4) are connected to motor phase currents (5) P1 to Pn so as to display the following electrical pattern: P1 –P1, –P2 P2, P3 –P3 . . . Pn –Pn, –P1 P1, P2 –P2, –P3 P3, . . . –Pn Pn and any electromagnetically invariant equivalents thereof.

3. A linear traveling field synchronous AC electric motor according to claim 1, characterized in that the ratio between the motor secondary side pole length (6) and primary side slot spacing is $\tau_p/\tau_s=6/5$.

4. A linear traveling field synchronous AC electric motor according to claim 1, characterized in that the ratio between the motor secondary side pole length (6) and primary side slot spacing is $\tau_p/\tau_s=6/7$.

5. A linear traveling field synchronous AC electric motor according to claim 1, characterized in that the ratio between the motor secondary side pole length (6) and primary side slot spacing is $\tau_p/\tau_s=6/11$.

6. A linear traveling field synchronous AC electric motor according to claim 1, characterized in that the ratio between the motor secondary side pole length (6) and primary side slot spacing is $\tau_p/\tau_s=6/13$.

7. A linear traveling field synchronous AC electric motor according to claim 1, characterized in that the ratio between the motor secondary side pole length (6) and primary side slot spacing is higher than 6/13.

8. A linear traveling field synchronous AC electric motor with concentrated windings (2) according to claim 1, characterized in that the ratio of secondary side pole length τp (6) to stator slot spacing τm (7) is such that $$\frac{\tau p}{\tau n} = \frac{m'}{m' \pm 1} \cdot q',$$

whereby for a symmetrical winding the number of virtual motor phases m' is equal to the number of real motor phases (5) m, and for an asymmetrical winding is equal to 2×m, and whereby the factor q' is equal to half the length of one toothed-module (4), i.e $$q' = \frac{z}{2},$$

when the module is wound with a free slot (13), and otherwise $$q' = q = \frac{N}{2 \cdot p \cdot m},$$

a whole number, where p represents the number of motor primary side poles (3), and N represents the number of primary side slots (13).

9. A linear traveling field synchronous AC electric motor with concentrated windings (2) according to claim 1, characterized in that the pole teeth (9) have practically parallel sides (8) resulting in a tooth structure with no pole shoe.

10. A linear traveling field synchronous AC electric motor with concentrated windings (2) according to claim 1, characterized in that the motor primary side (1) is constructed from laminations which are themselves formed as a single piece.

11. A linear traveling field synchronous AC electric motor with concentrated windings (2) according to claim 1, characterized in that the primary side windings (2) are pre-wound, inserted and fixed into the already completed stator structure (1).

12. A linear traveling field synchronous AC electric motor with concentrated windings (2) according to claim 1, characterized in that the number of electrical phases (5) 'P' is equal to three.

13. A linear traveling field synchronous linear AC electric motor with concentrated windings (2) and more than one primary side pole pair (3) according to claim 1, characterized in that one sequence of toothed-modules (4), physically at one extremity of the motor primary side, are concentrated to motor phases (P1 to Pn so as to display a partial sequence P1 –P1, –P2 P2, P3 –P3, . . . Pn –Pn or any electromagnetic equivalent thereof.

* * * * *